United States Patent
Hosoi

(10) Patent No.: US 6,668,103 B2
(45) Date of Patent: Dec. 23, 2003

(54) OPTICAL MODULATOR WITH MONITOR HAVING 3-DB DIRECTIONAL COUPLER OR 2-INPUT, 2-OUTPUT MULTIMODE INTERFEROMETRIC OPTICAL WAVEGUIDE

(75) Inventor: Toru Hosoi, Tokyo (JP)

(73) Assignee: NEC Corporation, Tokyo (JP)

( * ) Notice: Subject to any disclaimer, the term of this patent is extended or adjusted under 35 U.S.C. 154(b) by 82 days.

(21) Appl. No.: 09/768,453

(22) Filed: Jan. 25, 2001

(65) Prior Publication Data

US 2001/0009594 A1 Jul. 26, 2001

(30) Foreign Application Priority Data

Jan. 26, 2000 (JP) ........................................ 2000-017189

(51) Int. Cl.[7] ................................................ G02F 1/01
(52) U.S. Cl. ................................ 385/2; 385/8; 385/15; 385/129
(58) Field of Search .............................. 385/1, 2, 3, 14, 385/15, 8, 19, 24, 27, 129

(56) References Cited

U.S. PATENT DOCUMENTS

| | | | |
|---|---|---|---|
| 4,820,009 A | * | 4/1989 | Thaniyavarn ............ 350/96.13 |
| 4,900,112 A | * | 2/1990 | Kawachi et al. ......... 350/96.12 |
| 4,936,645 A | * | 6/1990 | Yoon et al. .............. 350/96.14 |
| 5,016,958 A | * | 5/1991 | Booth ..................... 350/96.13 |
| 5,044,715 A | * | 9/1991 | Kawachi et al. .............. 385/42 |
| 5,111,517 A | * | 5/1992 | Riviere ....................... 385/11 |
| 5,249,243 A | * | 9/1993 | Skeie ........................... 385/3 |
| 5,524,076 A | * | 6/1996 | Rolland et al. ................. 385/8 |
| 6,091,864 A | * | 7/2000 | Hofmeister ..................... 385/2 |
| 6,400,490 B1 | * | 6/2002 | Hosoi ........................ 359/254 |

FOREIGN PATENT DOCUMENTS

| | | |
|---|---|---|
| JP | 5-34650 | 2/1993 |
| JP | 5-173101 | 7/1993 |
| JP | 10-221664 | 8/1998 |
| JP | 11-44867 | 2/1999 |

* cited by examiner

Primary Examiner—Phan T. H. Palmer
(74) Attorney, Agent, or Firm—McGinn & Gibb, PLLC

(57) ABSTRACT

A Mach-Zehnder interferometric optical modulator with a monitor has two branched optical waveguides for causing light waves propagated therethrough to interfere with each other. A single light beam applied to an input optical waveguide is divided by a Y-shaped divider into equal light beams which travel through respective optical waveguides. At this time, the light beams in the respective optical waveguides are phase-modulated by $\pm\phi/2$ under an external electric field. The phase-modulated light beams are then combined by a Y-shaped coupler into a light beam that travels through output optical waveguides, which output from their output ends the light beams as a main signal and an inverted signal. Of the output light beams, the light beam as the inverted signal is detected as a monitor light beam by a photodetector.

21 Claims, 15 Drawing Sheets

PHASE VARIATION DUE TO
THE APPLIED VOLTAGE

OPTICAL MODULATOR WITH MONITOR HAVING 3-DB DIRECTIONAL COUPLER OR 2-INPUT, 2-OUTPUT MULTIMODE INTERFEROMETRIC OPTICAL WAVEGUIDE

BACKGROUND OF THE INVENTION

1. Field of the Invention

The present invention relates to an optical modulator with a monitor for use in optical communications, and more particularly to a Mach-Zehnder interferometric optical modulator with a monitor which has two branched optical waveguides for causing light waves propagated therethrough to interfere with each other.

2. Description of the Related Art

Optical modulation principles are roughly classified into a direct modulation process wherein a laser diode as a light source is directly controlled to modulate a laser beam emitted thereby and an external or internal modulation process wherein a semiconductor laser beam is externally or internally modulated. The former modulation process is mainly used for low-rate optical communications at communication rates up to 10 Gbps and the latter modulation process is mainly used for high-rate optical communications at higher communication rate.

Optical modulators based on the external modulation principles include a Mach-Zehnder interferometric optical modulator. The Mach-Zehnder interferometric optical modulator is widely used as an external modulator particularly for ultra-high-rate optical communication systems because it can provide modulation characteristics which are stable against disturbance and have a good S/N ratio by canceling out in-phase noise components with the push-pull application of a drive voltage.

FIG. 1A of the accompanying drawings shows a general Mach-Zehnder interferometric optical modulator. As shown in FIG. 1A, the Mach-Zehnder interferometric optical modulator has optical waveguide 82 embedded in the surface of optical substrate 81 having an electro-optic effect. Optical waveguide 82 includes input optical waveguide 82a divided into two optical waveguides 82b, 82c by a Y-shaped divider and output optical waveguide 82d combined from optical waveguides 82b, 82c by a Y-shaped coupler. The Mach-Zehnder interferometric optical modulator also has optical buffer layer 89 and traveling-wave electrode 84 in a certain pattern which are disposed on optical waveguides 82b, 82c.

A single linearly polarized light beam applied to input optical waveguide 82a is divided by the Y-shaped divider into equal light beams which travel respectively through optical waveguides 82b, 82c. At this time, an electric field generated by applying a voltage to traveling-wave electrode 84 from high-frequency power supply 87 is applied vertically to optical waveguides 82b, 82c in opposite directions, as shown in FIG. 1B of the accompanying drawings. Because of the electric field thus applied, the refractive indexes of optical waveguides 82b, 82c are changed by the electro-optic effect of optical substrate 81. The changes of the refractive indexes of optical waveguides 82b, 82c are equal in quantity, but opposite in sign. Therefore, the changes of the refractive indexes modulate the phases of the light beams in optical waveguides 82b, 82c in a push-pull manner. The light beams that are phase-modulated in optical waveguides 82b, 82c by ±φ/2, respectively, are combined by the Y-shaped coupler into a light beam that travels through output optical waveguide 82d, which outputs the light beam from its output end. The output light beam changes by $\cos^2(\phi/2)$ with respect to the total phase modulation φ. For example, when the light beams traveling through optical waveguides 82b, 82c are combined in phase with each other (φ=2nπ), the output light beam is of a maximum output, and when the light beams traveling through optical waveguides 82b, 82c are combined in opposite phase with each other (φ=(2n+1)π), the output light beam is of a minimum output (n=1, 2, 3, . . . ).

For optical intensity modulation, it is preferable to set an initial operating point of the Mach-Zehnder interferometric optical modulator shown in FIG. 1A to an intermediate point (π/2 phase) between the maximum and minimum outputs. To set such an initial operating point, there has been proposed an optical modulator design which is similar to the optical modulator shown in FIG. 1A except that it also has, as shown in FIG. 2A of the accompanying drawings, DC power supply 85 and bias circuit 86 in addition to high-frequency power supply 87 so as to be able to adjust the initial operating point. With the proposed optical modulator, in addition to the modulation signal (AC) voltage which is a drive voltage, a DC voltage for setting a bias is applied to the traveling-wave electrode 84 to change the refractive indexes of the optical waveguides due to the electro-optic effect of the optical substrate for thereby shifting the phase. FIG. 2B of the accompanying drawings shows output characteristics of the optical modulator shown in FIG. 2A at the time the DC voltage is 0 V.

The optical modulator shown in FIG. 2A is, however, disadvantageous in that it is unable to maintain stable modulation characteristics over a long period of time owing to time-dependent changes (DC drift) in the operating point. The DC drift often occurs if the optical substrate is made of lithium niobate crystal, for example.

In view of the above drawback, it has been proposed to detect a portion of the output light beam of the optical modulator as a monitor light beam, and supply the monitor light beam through a feedback loop to correct the applied voltage depending on a change in the electric field due to the DC drift. One proposed optical modulator with a monitor, which is disclosed in Japanese patent No. 2738078, is illustrated in FIG. 3 of the accompanying drawings.

The optical modulator shown in FIG. 3 is substantially similar to that of the optical modulator shown in FIG. 2A except that it has a structure for extracting a portion of the output light beam of the optical modulator as a monitor light beam and supplying the monitor light beam through a feedback loop. Those parts of the optical modulator shown in FIG. 3 which are identical to those of the optical modulator shown in FIG. 2A are denoted by identical reference characters.

In FIG. 3, input signal power supply 90 comprises high-frequency power supply 87, DC power supply 85, and bias circuit 86 shown in FIG. 2A, and is arranged to be able to adjust the initial operating point with the DC bias. To input optical waveguide 82a, there is connected single-mode optical fiber 92 which guides a light beam emitted by semiconductor laser 91 into input optical waveguide 82a. Output optical waveguide 82d is connected to single-mode optical fiber 93 which is branched into single-mode optical fibers 95, 96 by fiber coupler 94. A modulated light beam, i.e., a signal light beam, output from output optical waveguide 82d is divided by fiber coupler 94 into light beams that travel respectively through single-mode optical fibers 95, 96, from which the light beams are output. The modulated light beams, i.e., signal light beams, output from single-mode optical fibers 95, 96 are detected by respective photodetectors 97, 98. Photodetector 97 is a photodetector that belongs to a party with which to communicate. The photodetector 98 supplies its output signal to signal processor/controller 99.

The modulated light beam output from single-mode optical fiber 93 is divided by fiber coupler 94 into a light beam that is detected by photodetector 97 and a light beam that is detected by photodetector 98. Based on the light beam detected by photodetector 98, signal processor/controller 99 detects a change in the operating point and controls input signal power supply 90 and sends the detected change to input signal power supply 90 via a feedback loop for thereby adjusting the DC bias in input signal power supply 90 so as to catch up to a change in the electric field due to a DC drift.

The publication referred to above also proposes an optical modulator capable of monitoring light radiated from the optical substrate. FIGS. 4 and 5 of the accompanying drawings show such a proposed optical modulator with a monitor.

The optical modulator shown in FIG. 4 is similar to the optical modulator shown in FIG. 3 except that it has a structure for extracting light radiated from the optical substrate as a monitor light beam and supplying the monitor light beam through a feedback loop, instead of the structure for extracting a portion of the output light beam of the optical modulator as a monitor light beam and supplying the monitor light beam through a feedback loop. Those parts of the optical modulator shown in FIG. 4 which are identical to those of the optical modulator shown in FIG. 3 are denoted by identical reference characters.

As shown in FIG. 5, the propagated light partly leaks from the region where optical waveguides 82b, 82c are coupled to output optical waveguide 82d by the Y-shaped coupler, and the leaked light beam is radiated as radiated light 100 from a side of optical substrate 81 near the end face of output optical waveguide 82d. The total optical power and phase of radiated light 100 are complementary to those of the modulated light beam, i.e., the signal light beam, output from output optical waveguide 82d. In the optical modulator shown in FIG. 4, radiated light 100 is used as monitor light.

As shown in FIG. 4, signal light optical fiber 101 is coupled to the end face of output optical waveguide 82d, and monitor light optical fiber 102 for extracting radiated light 100 as monitor light is coupled to the side of optical substrate 81 near the end face of output optical waveguide 82d. These optical fibers 101, 102 are fixed in position by holder 103.

With the optical modulator shown in FIG. 4, the modulated light beam, i.e., the signal light beam, is propagated through signal light optical fiber 101 and detected by photodetector 97, and radiated light 100 is propagated through the radiated light optical fiber 102 and detected by photodetector 98. Based on the light beam detected by photodetector 98, signal processor/controller 99 detects a change in the operating point and controls input signal power supply 90 and sends the detected change to input signal power supply 90 via a feedback loop for thereby adjusting the DC bias in input signal power supply 90 so as to catch up to a change in the electric field due to a DC drift. It is also possible to recognize a modulated state of the light during communications by monitoring the output signal from photodetector 98.

The conventional optical modulators shown in FIGS. 3 and 4 suffer the following problems:

In the optical modulator shown in FIG. 3, since a portion of the modulated light beam, i.e., the signal light beam, is divided by the fiber coupler and used as a monitor light beam, the power of the transmitted signal light beam is reduced by the power of the divided monitor light beam. Therefore, the distance over which the signal light beam can be transmitted from the optical modulator is shortened. In addition, the fiber coupler that is required prevents the optical modulator from being reduced in cost and size.

In the optical modulator shown in FIG. 4, the radiated light from the optical substrate is used as the monitor light. The radiated light is radiated from the optical waveguide into the optical substrate when the light beams traveling through the branched optical waveguides are combined in opposite phase with each other, i.e., extincted, by the Y-shaped coupler. Since the radiated light spreads as it travels, only a portion of the radiated light reaches the end of the optical substrate, and hence the power of the radiated light that reaches the end of the optical substrate is small. Generally, because there is a trade-off between the detection sensitivity (minimum detection power level) of a photodetector and the detection range (maximum response frequency) thereof, the photodetector needs to have a high sensitivity if the power of the radiated light is small. The photodetector with a high sensitivity is expensive, or the detection range of the photodetector is unduly limited.

When the radiated light is monitored, the state of the modulated light or the signal light cannot accurately be recognized, and the radiated light may act as a noise component to lower the quality of optical communications.

SUMMARY OF THE INVENTION

It is therefore an object of the present invention to provide an optical modulator with a monitor which is small in size and low in cost and is capable of achieving an appropriate initial operating point and accurately recognizing the state of modulated light, i.e., signal light.

According to a first aspect of the present invention, an optical modulator with a monitor has a 3-dB directional coupler by which branched optical waveguides and output optical waveguides are coupled to each other, and photodetector means for detecting light output from one of the output optical waveguides as monitor light.

According to a second aspect of the present invention, an optical modulator with a monitor has a 2-input, 2-output multimode interferometric optical waveguide by which branched optical waveguides and output optical waveguides are coupled to each other, and photodetector means for detecting light output from one of the output optical waveguides as monitor light.

With the above arrangement, it is possible to control the optical modulator so that its operating point is shifted in advance by $\pi/2$.

The optical power at the time the light output of the optical modulator is extincted, i.e., when the light output is turned off, can be extracted via one of the output optical waveguides. Therefore, the optical power can be detected almost in its entirety as monitor light. Light radiated into an optical substrate of the optical modulator is prevented from acting as a noise component to lower the quality of optical communications.

The two light outputs from the 3-dB directional coupler are in opposite phase with each other and have an equal power. The two light outputs from the 2-input, 2-output multimode interferometric optical waveguide are in phase with each other and have an equal power. By monitoring one of the light outputs, the state of the other light output can be detected well without the phase or extinction ratio being degraded. The photodetector for detecting the monitor light is not required to be highly sensitive or expensive, unlike conventional optical modulators.

If the optical modulator has an optical path converter, then the monitor light can be extracted from a side of an optical modulator device which is different from a side thereof from which modulated light or signal light is output. Consequently, the photodetector for detecting the monitor light is held out of interference with an optical fiber for propagating the modulated light.

In any of the above arrangements of the present invention, a portion of the modulated light or signal light is not used as the monitor light. As a result, the power of the modulated light or signal light that is transmitted from the optical modulator is not unduly lowered. The optical modulator does not need a fiber coupler which would otherwise make it difficult to reduce the size and cost of the optical modulator.

The above and other objects, features, and advantages of the present invention will become apparent from the following description with reference to the accompanying drawings which illustrate examples of the present invention.

DESCRIPTION OF THE PREFERRED EMBODIMENTS

1st Embodiment

Figure 6:
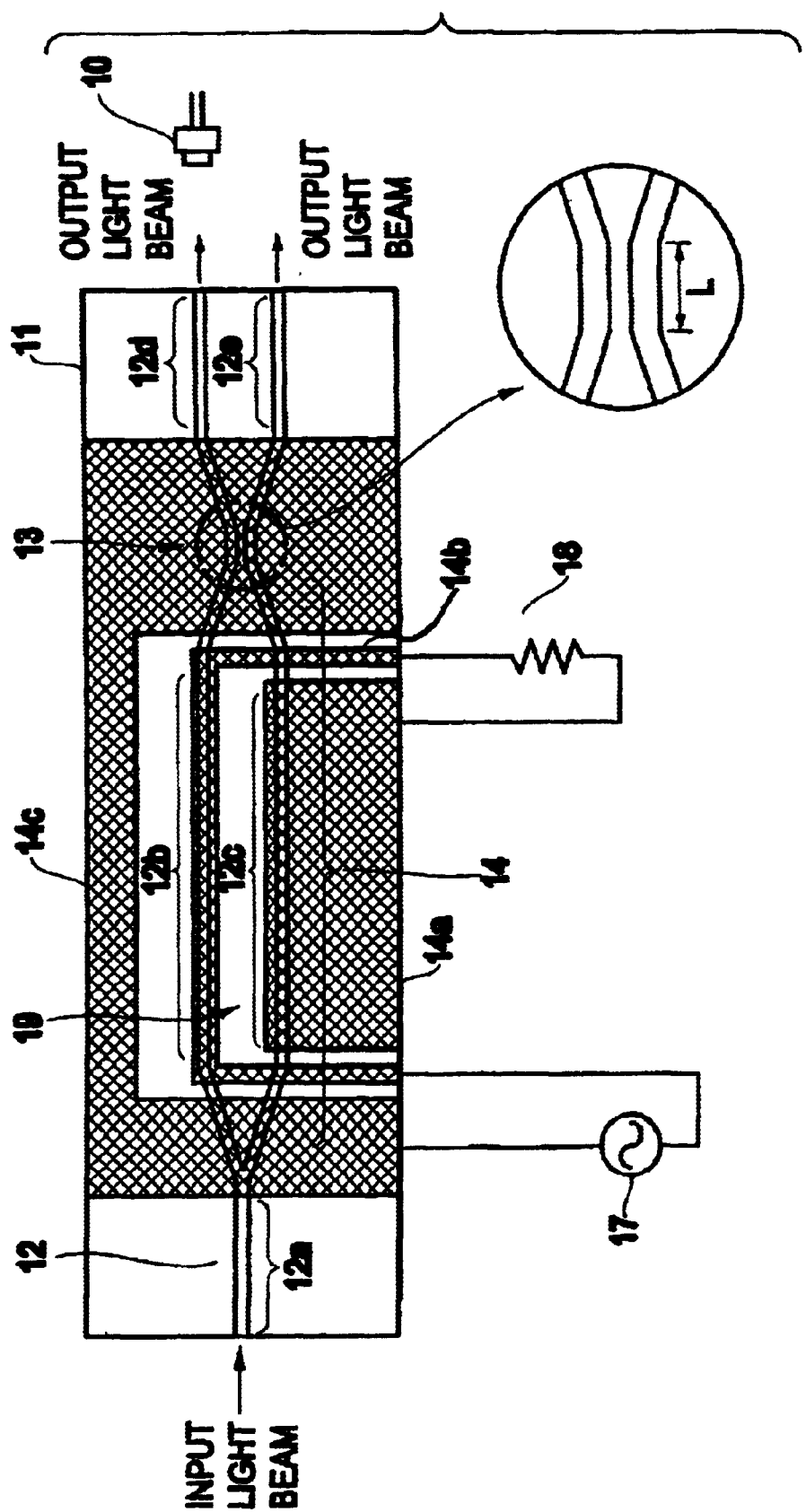
FIG. 6 is a schematic plan view of an optical modulator with a monitor according to a first embodiment of the present invention.

Referring now to FIG. 6, there is shown an optical modulator with a monitor according to a first embodiment of the present invention which comprises optical substrate 11 having an electro-optic effect, optical waveguide 12 disposed on the optical substrate 11, optical buffer layer 19 disposed on optical waveguide 12, and traveling-wave electrode 14 in a certain pattern which is disposed on optical buffer layer 19.

Optical waveguide 12 is of a Mach-Zehnder interferometric structure which includes an input optical waveguide 12a divided into two optical waveguides 12b, 12c by a Y-shaped divider and two output optical waveguides 12d, 12e coupled to respective optical waveguides 12b, 12c by 3-dB directional coupler 13. The Mach-Zehnder interferometric structure allows a desired optical output to be picked out of two optical outputs from the end faces of output optical waveguides 12d, 12e. The optical output from output optical waveguide 12d is detected as monitor light from photodetector 10.

Traveling-wave electrode 14 comprises ground electrode 14a partly disposed in overlapping relation to optical waveguide 12c, signal electrode 14b partly disposed in overlapping relation to optical waveguide 12b, and ground electrode 14c disposed in surrounding relation to electrodes 14a, 14b. Electrode 14b has its one end connected to electrodes 14a, 14c by terminator 18 and its other an opposite end connected to electrodes 14a, 14c by power supply circuit 17.

Figure 7:
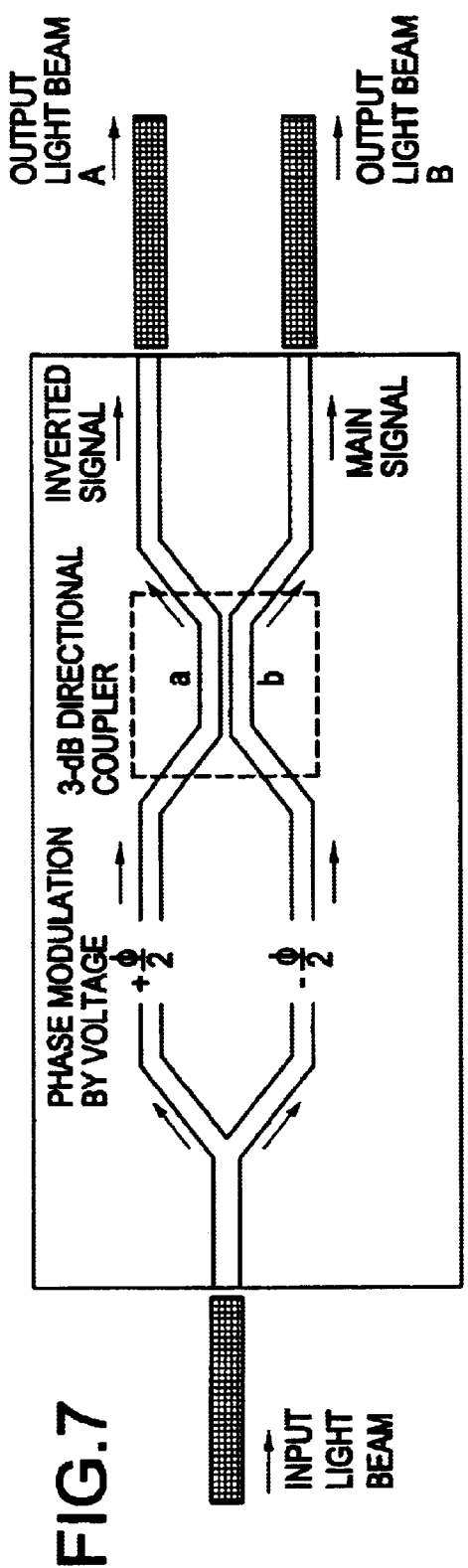
FIG. 7 is a schematic plan view showing the manner in which light waves are propagated in the optical modulator shown in FIG. 6.

FIG. 7 schematically shows the manner in which light waves are propagated in the optical modulator shown in FIG. 6. A light beam that has entered input optical waveguide 12a is divided by the Y-shaped divider into equal light beams which travel respectively through optical waveguides 12b, 12c. At this time, an electric field generated by applying a signal voltage to traveling-wave electrode 14 is applied vertically to optical waveguides 12b, 12c in opposite directions. The light beams are phase-modulated in optical waveguides 12b, 12c by $\pm\phi/2$, respectively. The phase-modulated light beams are combined by 3-dB directional coupler 13 and then travel respectively through output optical waveguides 12d, 12e, which output the respective light beams as a main signal and an inverted signal from their output ends. The output light beam, i.e., the inverted signal, from output optical waveguide 12d is detected as a monitor light beam by photodetector 10.

Figure 8:
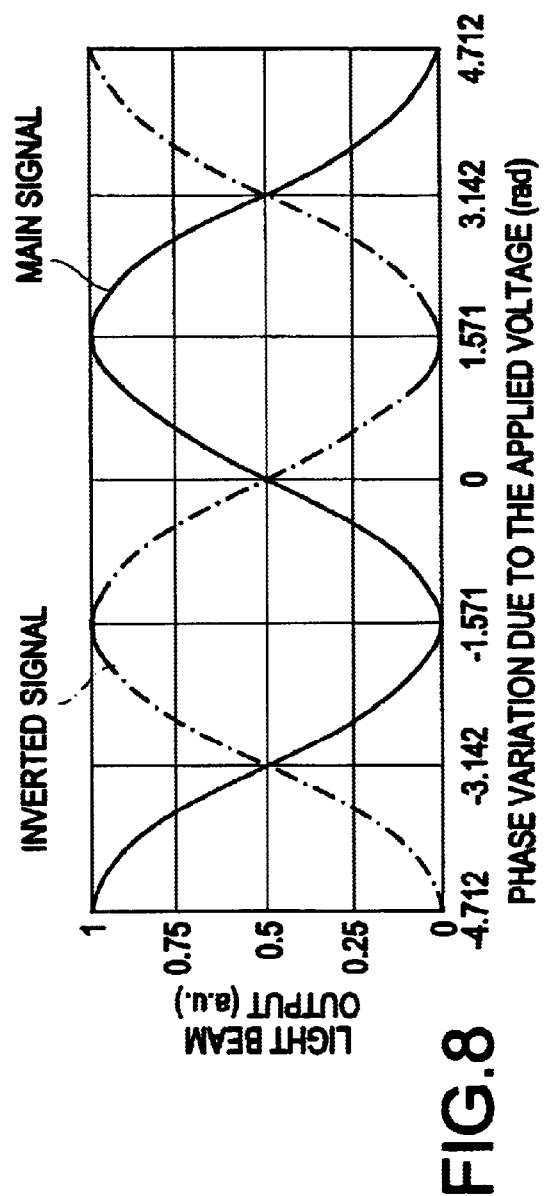
FIG. 8 is a waveform diagram showing how output light beams change in response to an input signal voltage in the optical modulator shown in FIG. 6.

FIG. 8 shows how the output light beams change in response to an input signal voltage in the optical modulator shown in FIG. 6. As shown in FIG. 8, the output light beams from output optical waveguides 12d, 12e are in opposite phase with each other and have the same light intensity. Therefore, when one of the output light beams from output optical waveguides 12d, 12e is monitored, the state of the other output light beam can be recognized. The optical modulator according to the present embodiment is based on the above principles. Specifically, the output light beam, i.e., the main signal, from output optical waveguide 12d is transmitted to a party to communicate with, whereas the output light beam, i.e., the inverted signal, from output optical waveguide 12e is detected as a monitor light beam by photodetector 10. In this manner, it is possible to recognize a modulated state of the light beams during communications.

It is also possible to send the output of photodetector 10 to power supply circuit 17 through a feedback loop. Specifically, the output of photodetector 10 is applied to a signal processor/controller (not shown), which detects a change in the operating point based on the detected light beam from photodetector 10. The detected change is supplied via a feedback loop to power supply circuit 17 to adjust the DC bias in power supply circuit 17 to so as to catch up to a change in the electric field due to a DC drift.

Figure 1A:
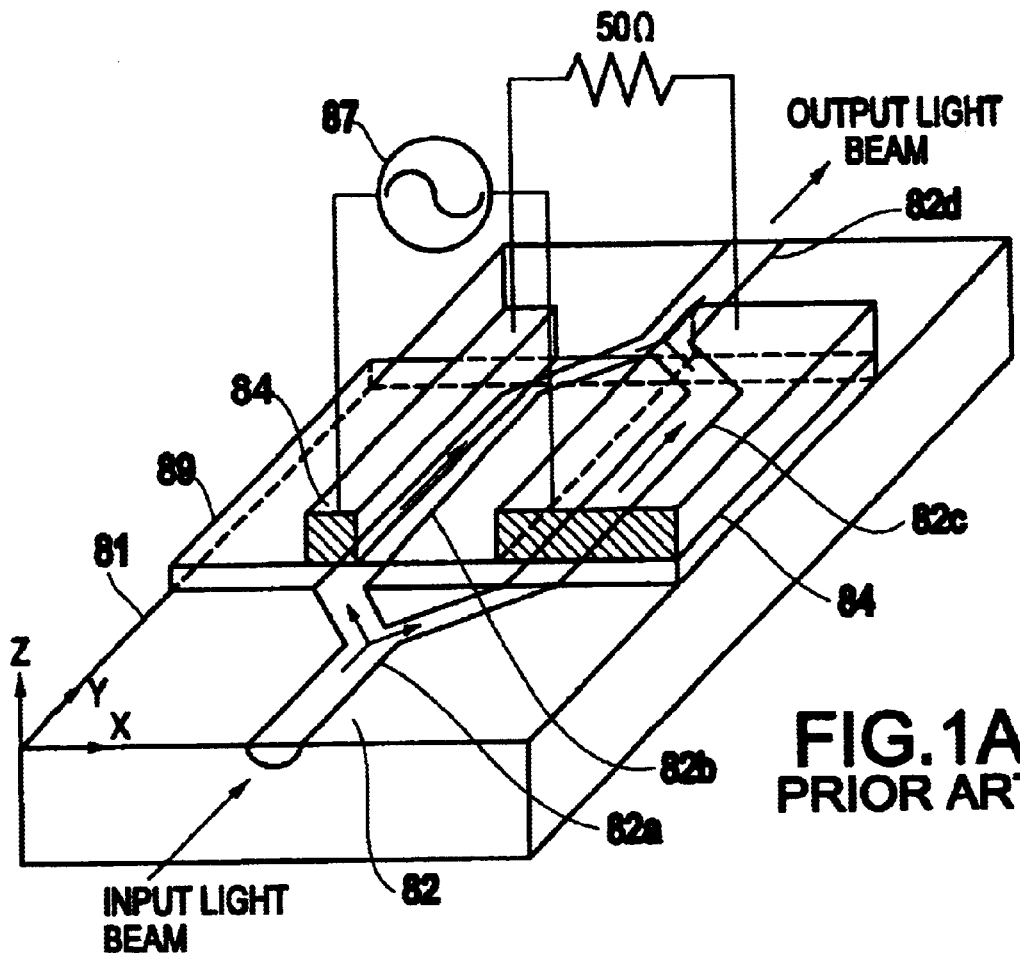
FIG. 1A is a perspective view of a general Mach-Zehnder interferometric optical modulator.
Figure 1B:
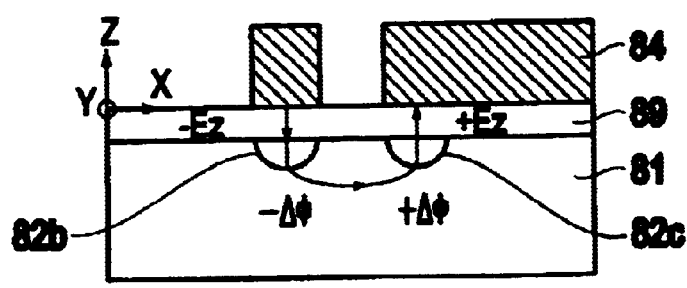
FIG. 1B is a cross-sectional view of the Mach-Zehnder interferometric optical modulator shown in FIG. 1A, illustrating the manner in which an electric field is applied to optical waveguides through which light waves to interfere with each other are propagated.
Figure 2A:
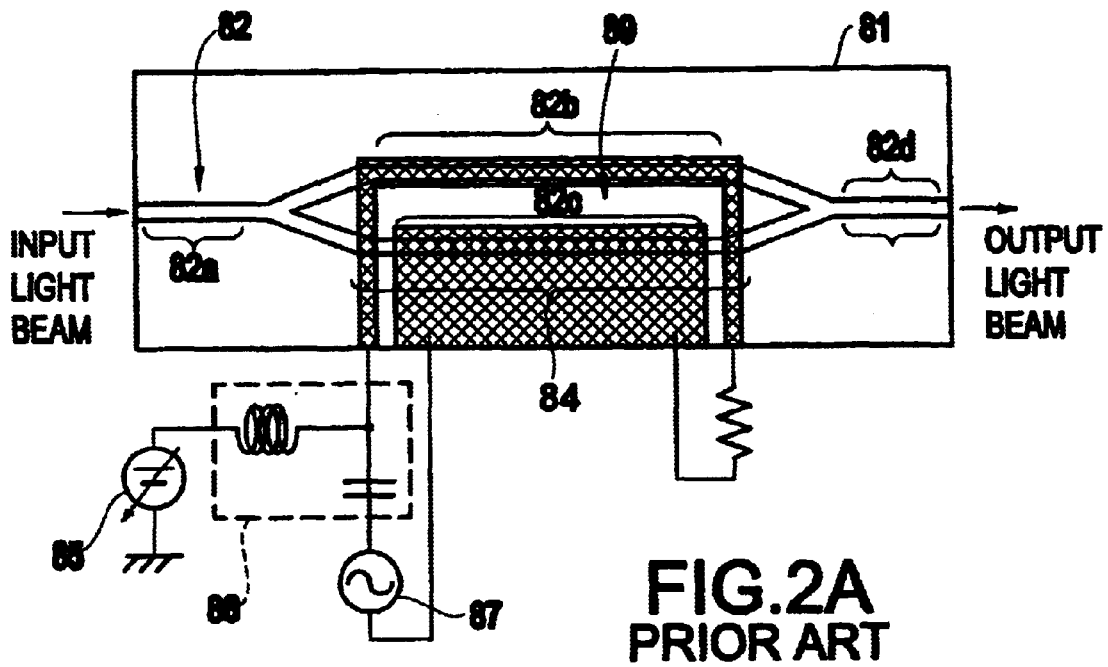
FIG. 2A is a schematic plan view of a Mach-Zehnder interferometric optical modulator whose initial operating point can be adjusted.
Figure 2B:
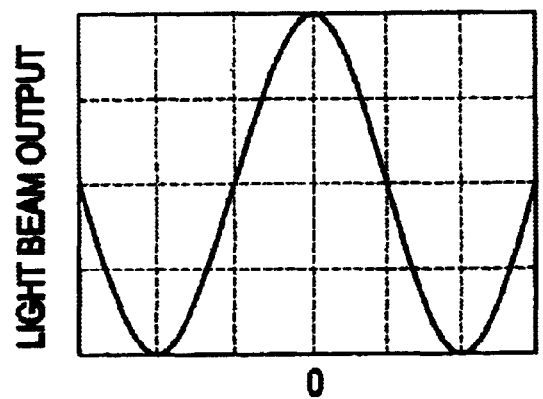
FIG. 2B is a waveform diagram showing output characteristics of the Mach-Zehnder interferometric optical modulator shown in FIG. 2A at the time the DC voltage is 0 V.
Figure 3:
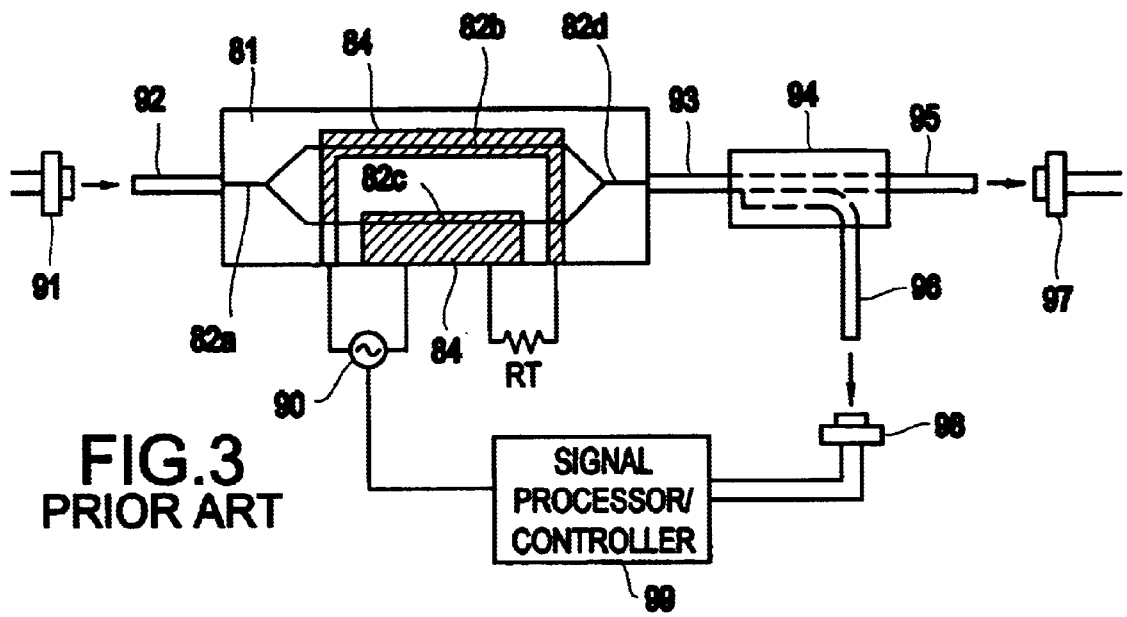
FIG. 3 is a plan view, partly in block form, a conventional optical modulator with a monitor.
Figure 4:
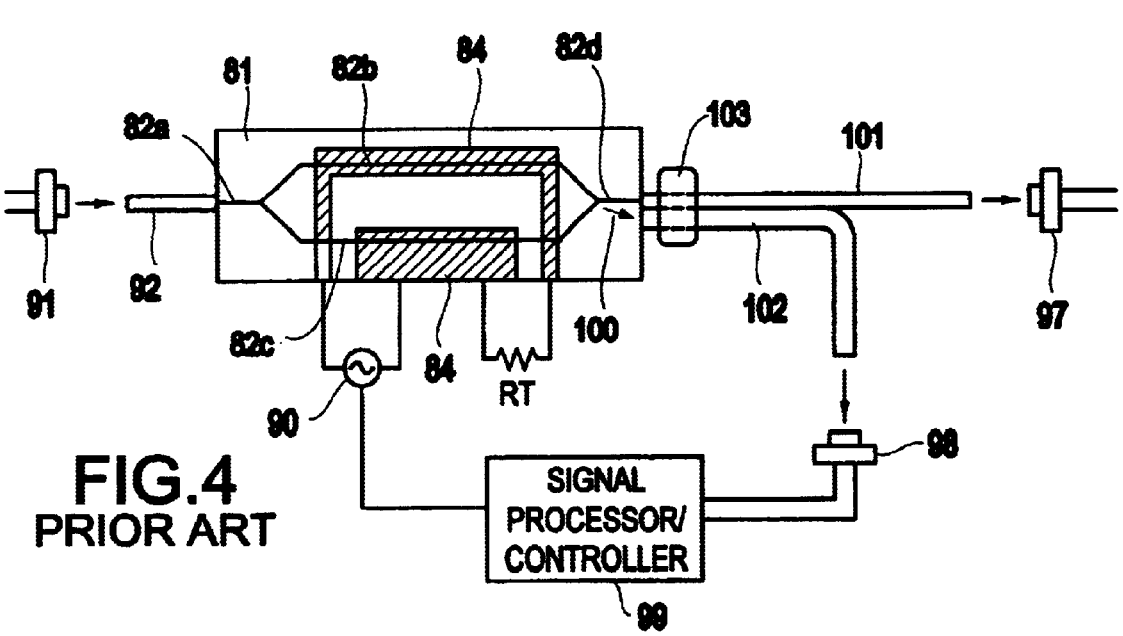
FIG. 4 is a schematic plan view, partly in block form, another conventional optical modulator with a monitor.
Figure 5:
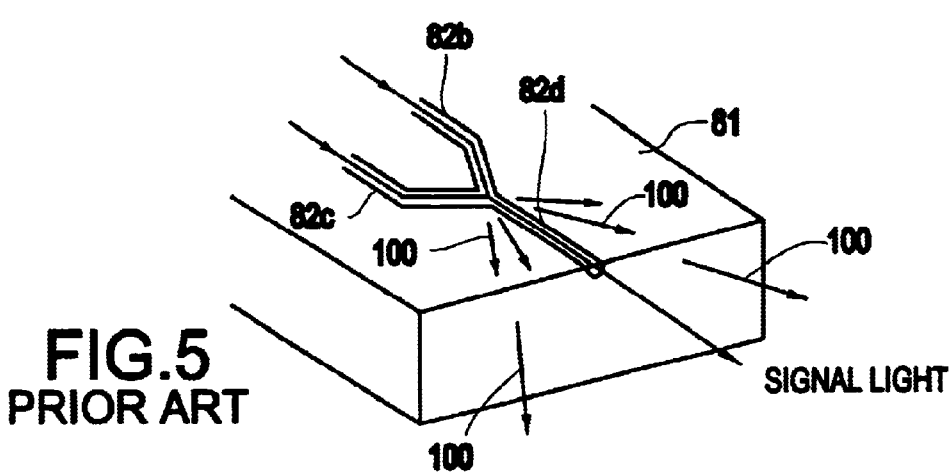
FIG. 5 is a fragmentary perspective view illustrative of radiated light in the conventional optical modulator shown in FIG. 4.

With the DC bias adjusted, the output light beams from output optical waveguides 12d, 12e can stably be kept in a zero-crossing state wherein their output intensities are identical to each other when the applied signal voltage is 0 V, so that good modulation characteristics are provided. Power supply circuit 17 comprises a DC power supply and a bias circuit as shown in FIG. 2.

Specific structural details of optical modulator devices and a process of fabricating them will be described below. In the following example, the optical waveguides are fabricated of a Z-cut Y-axis-propagated lithium niobate crystal by titanium diffusion.

Optical Modulator Device Example 1:

In the structure shown in FIG. 6, optical substrate 11 comprises a Z-cut Y-axis-propagated lithium niobate crystal substrate. A thin film pattern of titanium having a width ranging from 6 to 10 μm and a thickness ranging from 60 to 110 nm is formed on lithium niobate crystal substrate 11. The thin film pattern of titanium is thermally diffused in a gas atmosphere containing oxygen and water vapor, which may also contain an inactive gas such as nitrogen or argon, at a temperature ranging from 950 to 1100° C. for a period of time ranging from 6 to 15 hours, thus forming optical waveguide 11. If the wavelength is in a 1.55 μm band, then the pattern of 3-dB directional coupling 13 to be formed as a portion of optical waveguide 12 should preferably have a gap of 7 μm or less between the two optical waveguides of 3-dB directional coupling 13 and a coupling length of 10 mm or less.

Then, optical buffer layer 19 made of $SiO_2$ and having a thickness ranging from 0.5 to 2.5 μm is formed on the surface of optical waveguide 12 by a known process such as vacuum evaporation, CVD, or sputtering. Optical buffer layer 19 serves to confine light waves efficiently. The $SiO_2$ layer has a refractive index of about 1.5 which is smaller than the refractive index of titanium-diffused optical waveguides 12a–12e of optical waveguide 12. For forming optical buffer layer 19, it is preferable that the assembly be heat-treated in an oxygen atmosphere at a temperature ranging from 500 to 800° C. in order to compensate for an oxygen loss and increase the electric resistance of the dielectric layer. The $SiO_2$ layer may be replaced with a dielectric layer of $Al_2O_3$ or ITO which does not absorb the guided waves and has a smaller refractive index than the optical substrate 11.

Finally, a metal layer of titanium and gold, for example, having a thickness of about 0.1 μm is patterned to a desired shape having a width ranging from 6 to 12 μm on optical buffer layer 19 and optical substrate 11 according to photolithography and a thin-film fabrication technique, thus forming a base metal layer. Then, a gold film is deposited to a thickness ranging from 10 to 40 μm according to a gold plating process, thereby forming electrodes 14a–14c. In this fashion, the optical modulator device is completed.

Optical Modulator Device Example 2:

In the structure shown in FIG. 6, optical substrate 11 comprises a Z-cut Y-axis-propagated lithium niobate crystal substrate. A photoresist is coated on lithium niobate crystal substrate 11, and then processed into a predetermined resist pattern according to an exposure technique. The resist pattern serves to form a pattern of straight input and output optical waveguides 12a, 12d, 12e and interferometric optical waveguides 12b, 12c, and is of such a shape as to be able to form an optical waveguide pattern having a width of 7 μm. Furthermore, the resist pattern is of such a shape as to be able to form an optical waveguide pattern in which two adjacent straight patterns spaced by 2 μm from each other extend for a distance of 1.3 mm, in the region of directional coupler 13 at the terminal end of the interferometric optical waveguides.

After the resist pattern is formed, a thin film of titanium is deposited to a thickness of 84 nm on the resist pattern by spurring, and then lifted off using an organic solvent such as of acetone, forming an optical waveguide pattern of thin film of titanium. The optical waveguide pattern is then thermally diffused in an oxygen atmosphere containing water vapor at 1045° C. for 8 hours, thereby fabricating a single-mode titanium-diffused optical waveguide as optical waveguide 12.

Then, thin metal films of titanium and gold are deposited to respective thicknesses of 0.02 μm and 0.1 μm on optical substrate 11 with optical buffer layer 19 formed thereon. Thereafter, an electrode pattern of electrodes having a width of 9 μm and spaced by 26 μm from each other is formed by an exposure technique. Then, the electrode pattern is coated with a resist, which is processed into a resist pattern having a total thickness of about 30 μm as a certain electrode pattern by an exposure technique. Using the resist pattern as a mask, a gold film is deposited to a thickness of 26 μm according to an electric-field gold plating process, thereby forming the electrodes, after which the resist pattern is removed to complete the traveling-wave electrode 14.

2nd Embodiment

In the first embodiment, the light beams propagated through interferometric optical waveguides 12b, 12c are combined with each other by the 3-dB directional coupler. However, a 2×2 port MMI (Multi-Mode Interference) optical waveguide may be employed in place of the 3-dB directional coupler.

Figure 9:
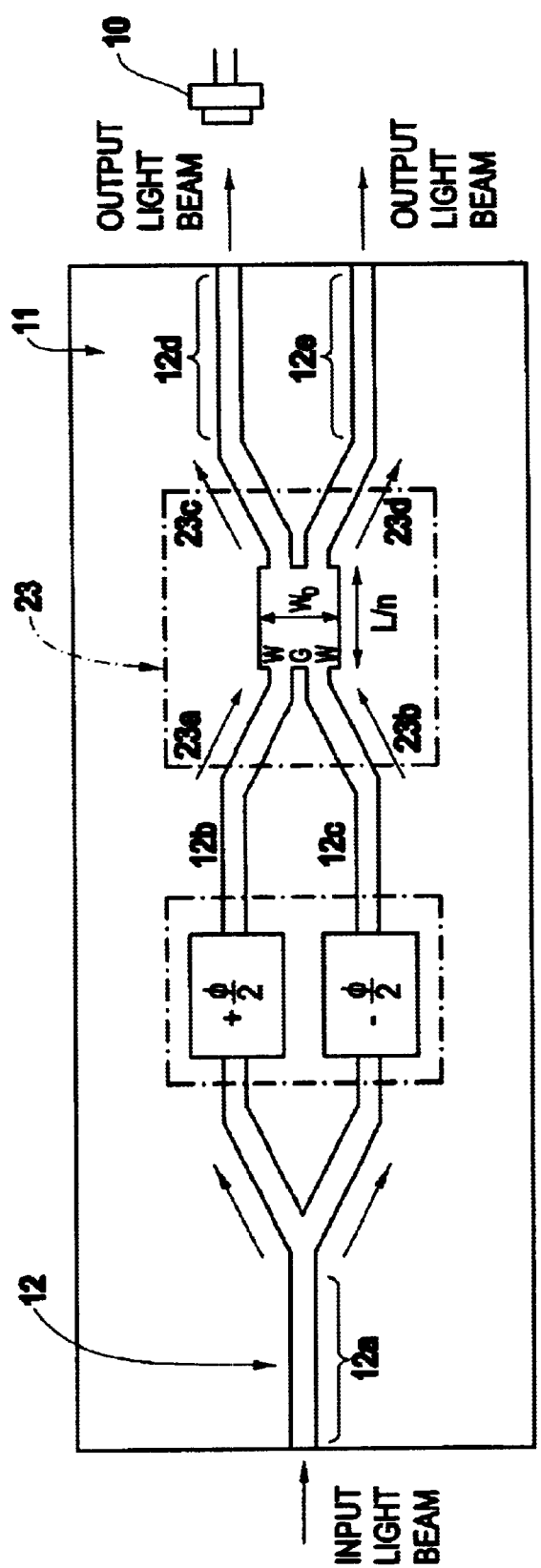
FIG. 9 is a schematic plan view of an optical modulator with a monitor which has an MMI-type waveguide according to a second embodiment of the present invention.

FIG. 9 shows an optical modulator with a monitor which has an MMI-type waveguide according to a second embodiment of the present invention. Those parts of the optical modulator shown in FIG. 9 which are identical to those of the optical modulator shown in FIG. 6 are denoted by identical reference characters, and will not be described in detail below.

The optical modulator shown in FIG. 9 comprises an optical substrate 11 having an electro-optic effect, optical waveguide 12 disposed on optical substrate 11, optical buffer layer 19 disposed on optical waveguide 12, and traveling-wave electrode 14 in a certain pattern which is disposed on optical buffer layer 19. Optical waveguide 12 is of a Mach-Zehnder interferometric structure which includes an input optical waveguide 12a divided into two optical waveguides 12b, 12c by a Y-shaped waveguide and two output optical waveguides 12d, 12e coupled to respective optical waveguides 12b, 12c by 2-input, 2-output MMI-type waveguide 23. MMI-type waveguide 23 has an optical waveguide width W ranging from 6 to 9 μm and an optical waveguide gap G ranging from 10 to 25 μm, and includes a multimode optical waveguide having a width Wm ranging from 28 to 45 μm and a length Lm ranging from 2 to 6 mm. Although not shown in FIG. 9, the optical modulator also has a traveling-wave electrode and a modulation circuit as described in the first embodiment.

Generally, the MMI-type waveguide has the following three features:
(1) It branches a light beam into light beams having equal powers at a branching ratio of 50:50.
(2) Its fabrication tolerances are large.
(3) Its wavelength dependency is small.
As seen from the description of "Small-size MMI coupler using Ti:LiNbO$_3$" of 4a-ZB-8 in the collected preprints for the 58th Applied Physic Society Lecture Meeting (October 1997, p. 1117), the MMI-type waveguide can be designed by analytical calculations, and its fabrication tolerances are larger than those of directional couplers.

Figure 10:
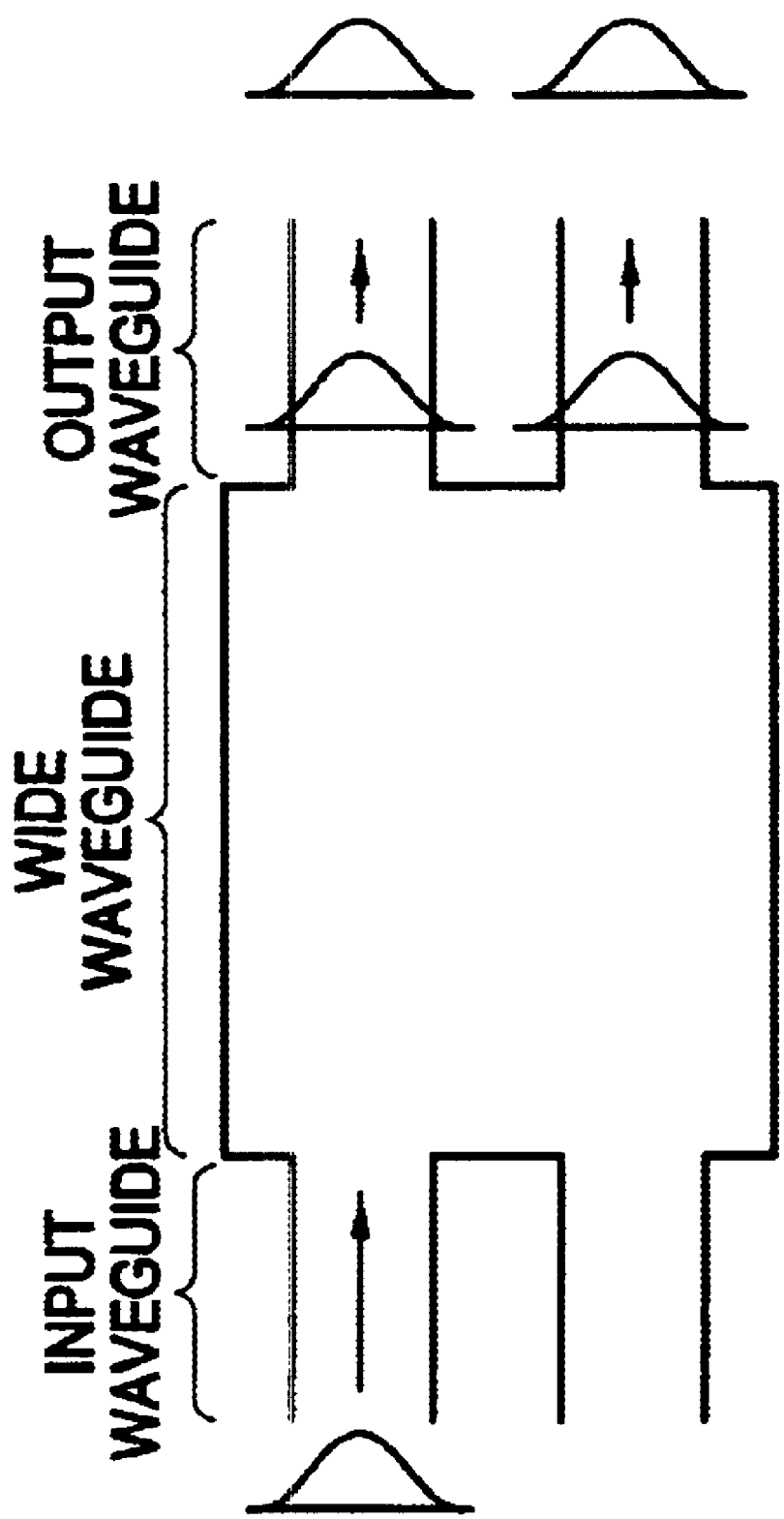
FIG. 10 is a schematic view illustrative of the principles of the MMI-type waveguide.

FIG. 10 schematically shows the principles of 2-input, 2-output the MMI-type waveguide. The MMI-type waveguide converts a single-mode light beam input from one of narrow input optical waveguides into a multimode (higher-order mode) light beam in a wide optical waveguide, and the multimode light beam is smoothly converted into a single mode light beam as it approaches the field distribution of two output optical waveguides, by which the single mode light beam is branched into light beams of equal powers.

MMI-type waveguide 23 shown in FIG. 9 branches a light beam input from the branched optical waveguide 12b into light beams of equal powers, and simultaneously branches a light beam input from the branched optical waveguide 12c into light beams of equal powers. These branched light beams are then propagated through respective output optical waveguides 12d, 12e, which output the light beams. The MMI-type waveguide structure allows a desired one of the two light outputs from output optical waveguides 12d, 12e to be selected as modulated light. In this embodiment, a light output from output optical waveguide 12d is detected as monitor light by photodetector 10.

Since output light beams from output optical waveguides 12d, 12e are in phase with each other and have identical light intensities, when one of the output light beams from output optical waveguides 12d, 12e is monitored, the state of the other output light beam can be recognized. The optical modulator according to the present embodiment is based on the above principles. Specifically, the output light beam, i.e., the main signal, from output optical waveguide 12e is transmitted to a party to communicate with, whereas the output light beam, i.e., the inverted signal, from output optical waveguide 12d is detected as a monitor light beam by photodetector 10. In this manner, it is possible to recognize a modulated state of the light beams during communications.

It is also possible to send the output of photodetector 10 to power supply circuit 17 through a feedback loop. Specifically, the output of photodetector 10 is applied to a signal processor/controller (not shown), which detects a change in the operating point based on the detected light beam from photodetector 10. The detected change is supplied via a feedback loop to power supply circuit 17 to adjust the DC bias in power supply circuit 17 to so as to catch up to a change in the electric field due to a DC drift.

With the DC bias adjusted, the output light beams from output optical waveguides 12d, 12e can stably be kept in a zero-crossing state wherein their output intensities are identical to each other when the applied signal voltage is 0 V, so that good modulation characteristics are obtained.

In general, the optical modulator with the Mach-Zehnder interferometric optical waveguide structure produces a substantial amount of radiated light from the Y-shaped divider, and such radiated light is combined again in the coupler, adversely affecting the modulation characteristics. In the present embodiment, as the coupler is constructed of the MMI-type waveguide, the effect of radiated light is reduced in the wide optical waveguide region (multimode region) of the MMI-type waveguide, further improving the quality of optical communications.

Inasmuch as the MMI-type waveguide divides an input light beam at a ratio of 1:1, the modulated light beam, i.e., the signal light beam, and the monitor light beam are kept at a ratio of 1:1, so that the state of the modulated light can easily and accurately be detected.

Each of the optical modulators according to the first and second embodiments can use any of various optical path converters for guiding the guided light, i.e., the monitor light, to the photodetector. Several optical path converters that can be used in the present invention will be described below. Arrangements according to third through tenth embodiments to be described below are applied to the first embodiment, but are also applicable to the second embodiment.

3rd Embodiment

Figure 11:
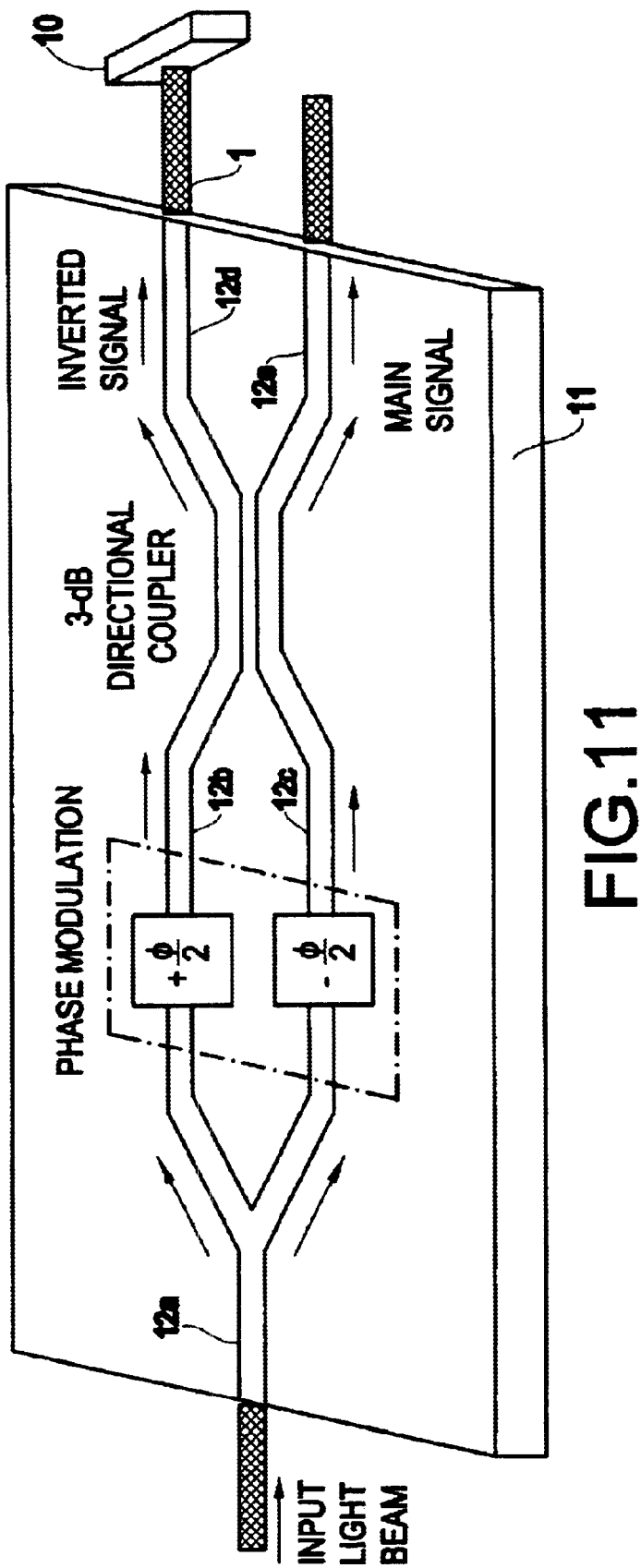
FIG. 11 is a schematic plan view of an optical modulator with a monitor according to a third embodiment of the present invention.

FIG. 11 shows an optical modulator with a monitor according to a third embodiment of the present invention. The optical modulator according to the third embodiment is similar to the optical modulator shown in FIG. 6 except that it has optical fiber 1 for guiding monitor light to photodetector 10. Optical fiber 1 has its one end coupled to the end face of output optical waveguide 12d, so that output light from output optical waveguide 12d is applied as monitor light via optical fiber 1 to photodetector 10.

The optical modulator according to the third embodiment is capable of detecting the monitor light more efficiently than the optical modulator shown in FIG. 6, but can be manufactured according to substantially the same fabrication process as the optical modulator shown in FIG. 6. Optical fiber 1 may be laid in such a pattern as to allow the photodetector to be positioned with certain freedom within a package which houses the optical modulator. Since an optical path along which the monitor light travels to photodetector 10 is equivalent to an optical path along which the light output as the main signal travels, the monitor light can be monitored while it is being held in inverted phase with the main signal.

4th Embodiment

Figure 12:
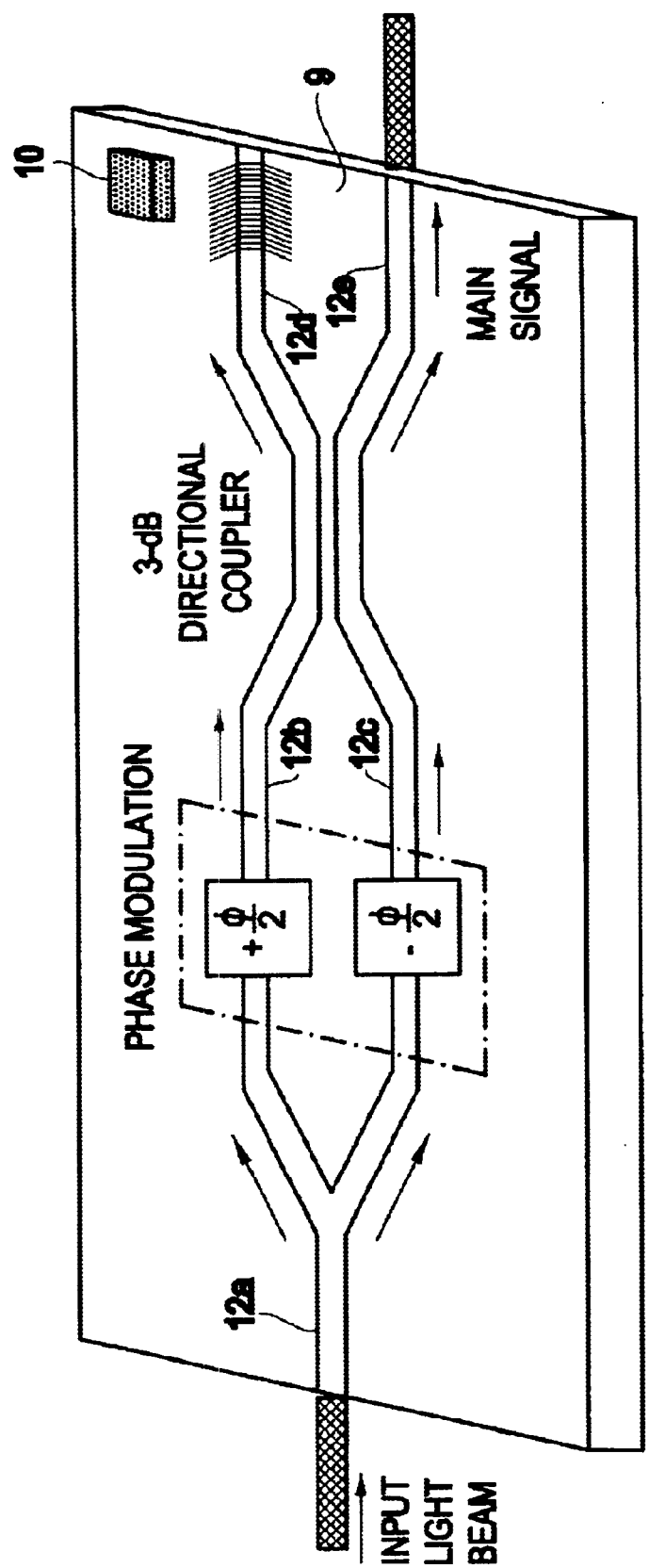
FIG. 12 is a schematic plan view of an optical modulator with a monitor according to a fourth embodiment of the present invention.

FIG. 12 shows an optical modulator with a monitor according to a fourth embodiment of the present invention. The optical modulator according to the fourth embodiment is similar to the optical modulator shown in FIG. 6 except for a structure for guiding monitor light to photodetector 10.

The optical modulator according to the fourth embodiment has grating coupler 9 formed in output optical waveguide 12d. The period or pattern of grating coupler 9 may suitably be modulated to converge the guided light to an external point for being extracted from the optical modulator (see D. Heitman and C. Ortiz, IEEE J. Quantum Electron, QE-17, 7, p. 1257, July 1981). In the present embodiment, the light propagated through output optical waveguide 12d is extracted in a direction perpendicular to the substrate surface by grating coupler 9, and converged to a point on the detection surface of photodetector 10 that is positioned above optical substrate 11.

Grating coupler 9 may be of an index-modulated or relief-shaped grating structure, and may be curved to provide a converging function at the time the grating is formed in the optical waveguide. The grating may be patterned according to a known photolithographic process using a resist mast, a two-beam interference process which employs interference fringes that are produced when two coherent light beams interfere with each other, as described in "Optical integrated circuit", written by Nishihara, Haruna, and Suhara, published by Ohmu-sha, Chapter 7, p. 215–p. 230, or an electron beam lithography process which draws a desired pattern with an electron beam.

With the optical modulator according to the fourth embodiment, since photodetector 10 is disposed above the surface of optical substrate 11, photodetector 10 does not interfere with the mounting of electric connectors and optical fibers that are disposed on sides of optical substrate 11. Therefore, greater design and fabrication freedom is available for the installation of the photodetector.

5th Embodiment

Figure 13:
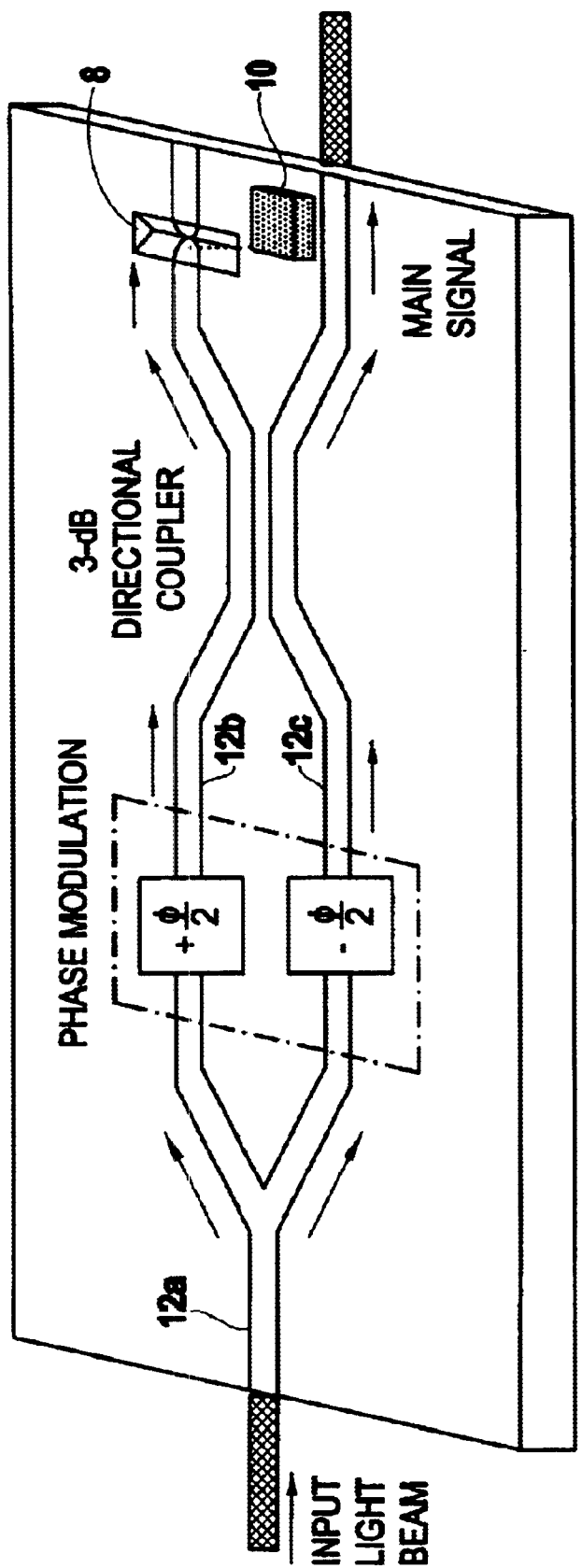
FIG. 13 is a schematic plan view of an optical modulator with a monitor according to a fifth embodiment of the present invention.

FIG. 13 shows an optical modulator with a monitor according to a fifth embodiment of the present invention. The optical modulator according to the fifth embodiment is also similar to the optical modulator shown in FIG. 6 except for a structure for guiding monitor light to photodetector 10.

The optical modulator according to the fifth embodiment has a V-shaped groove 8 formed in output optical waveguide 12d for reflecting the monitor light propagated through output optical waveguide 12d toward the reverse side of optical substrate 11. V-shaped groove 8 can be formed by an Ar-gas ion beam etching process using a mask of aluminum (see Applied Physics Society, Spring 1990, 29p-F-8). When V-shaped groove 8 is formed, the assembly may be annealed at 400° C. for 4 hours in a diffusion furnace to recover from the damage that has been caused to the waveguide by the etching.

Photodetector 10 is mounted on the reverse side of optical substrate 11 for detecting the monitor light that is reflected by V-shaped groove 8. Since photodetector 10 is mounted on the reverse side of optical substrate 11, photodetector 10 does not interfere with the optical waveguide and power supply circuit on the surface of optical substrate 11.

In the illustrated embodiment, the optical path converter comprises the V-shaped groove 8. However the optical path converter may comprise a Λ-shaped ridge.

6th Embodiment

The optical waveguide may have a recess that is rotationally symmetric with respect to an axis normal to the surface of the optical waveguide, and the recess may be of a shape selected to provide desired optical path conversion characteristics. Such a structure used to guide the monitor light to the photodetector will be described below.

Figure 14:
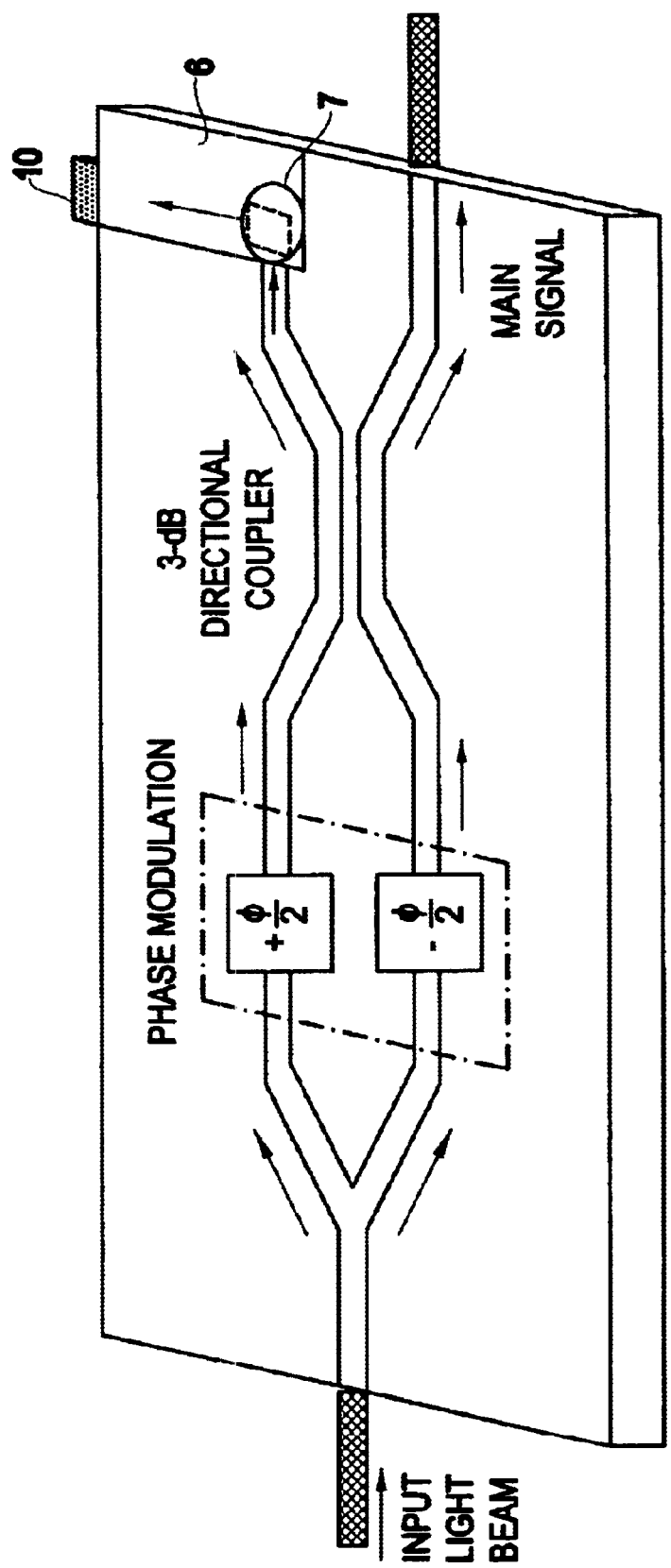
FIG. 14 is a schematic plan view of an optical modulator with a monitor according to a sixth embodiment of the present invention.

FIG. 14 shows an optical modulator with a monitor according to a sixth embodiment of the present invention. The optical modulator according to the sixth embodiment is similar to the optical modulator shown in FIG. 6 except for a structure for guiding monitor light to photodetector 10.

The optical modulator according to the sixth embodiment has a two-dimensional optical waveguide, i.e., slab waveguide 6 having an end face partly coupled to the end face of output optical waveguide 12d. A deflector 7 in the shape of a recess described above is formed in two-dimensional optical waveguide 6. Two-dimensional optical waveguide 6 with deflector 7 can be fabricated by forming a recess of given diameter and depth in a glass substrate and depositing epoxy in the recess (see S. Sottini, et. al, J. Opt. Soc. Am., 70, 10, 1230, 1980).

With the optical modulator according to the sixth embodiment, the monitor light propagated through output optical waveguide 12d travels into two-dimensional optical waveguide 6, is deflected through a deflection angle of about 45° by deflector 7, propagated through two-dimensional optical waveguide 6, and detected by photodetector 10 that is positioned on a side of optical substrate 11. Since the monitor light propagated through output optical waveguide 12d can be deflected in a desired direction by deflector 7 and extracted, photodetector 10 can be placed in a desired position on a side of optical substrate 11. Therefore, photodetector 10 may be disposed in a position out of interference with electric connectors and an optical fiber for transmitting the modulated light.

In FIG. 14, photodetector 10 is directly fixed to the side of optical substrate 11. However, photodetector 10 may be fixed in advance to a side of the package which houses the optical modulator, optical modulator devices may be set in a given position in the package, and the monitor light from the optical modulator devices may be detected by photodetector 10. If photodetector 10 is mounted on the package, then it is more preferable from a layout viewpoint to extract the monitor light from the side of optical substrate 11 than to extract the monitor light from the end face of optical substrate 11 where the output light as the main signal is extracted.

7th Embodiment

Figure 15:
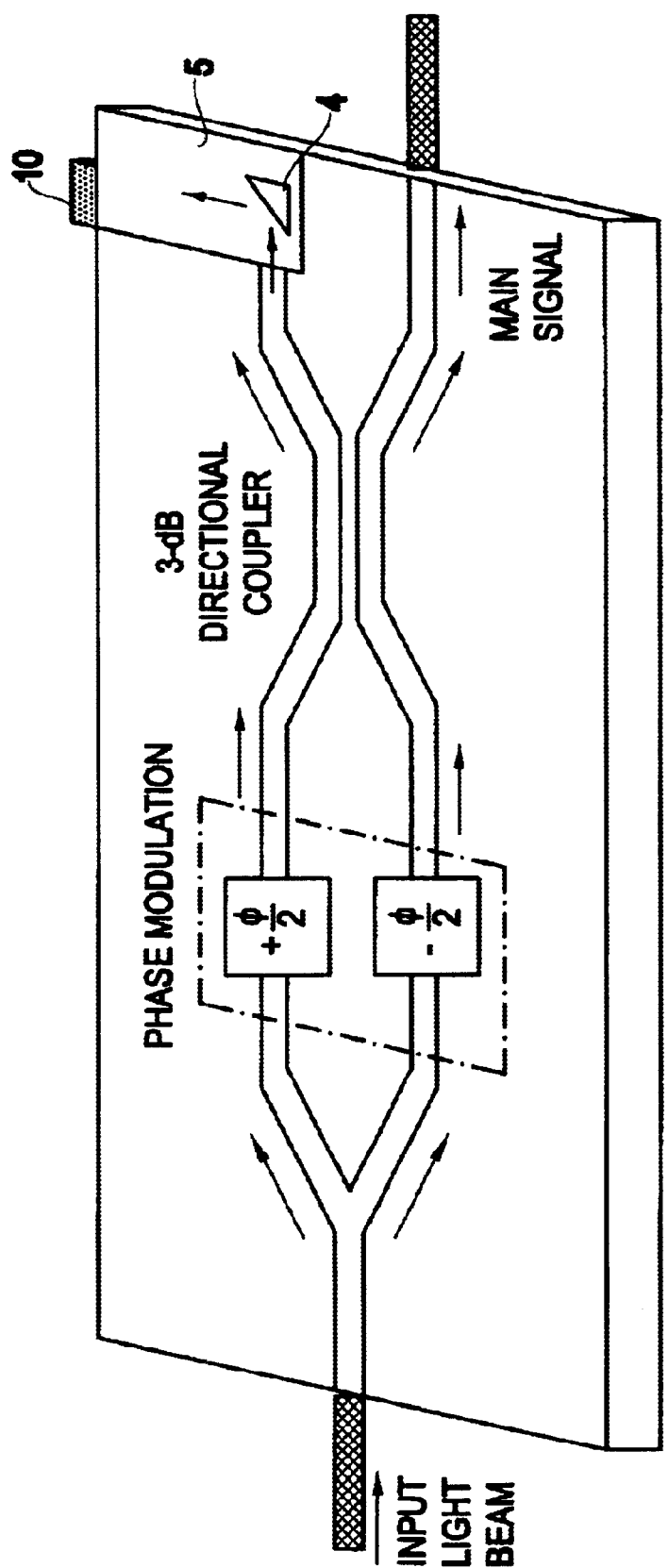
FIG. 15 is a schematic plan view of an optical modulator with a monitor according to a seventh embodiment of the present invention.

FIG. 15 shows an optical modulator with a monitor according to a seventh embodiment of the present invention. The optical modulator according to the seventh embodiment is similar to the optical modulator shown in FIG. 6 except for a structure for guiding monitor light to photodetector 10.

The optical modulator according to the seventh embodiment has a two-dimensional optical waveguide, i.e., slab waveguide 5 having an end face partly coupled to the end face of output optical waveguide 12d. Reflecting mirror 4 is disposed in output optical waveguide 12d. Reflecting mirror 4 serves to reflect the monitor light propagated through output optical waveguide 12d toward photodetector 10 disposed on a side of optical substrate 11. Reflecting mirror 4 is made of a material whose refractive index is different from the refractive index of two-dimensional optical waveguide 5. For example, reflecting mirror 4 may be produced by forming a region of lower refractive index in two-dimensional optical waveguide 5 by not diffusing titanium, for example. Alternatively, reflecting mirror 4 may be produced by forming a hole in two-dimensional optical waveguide 5 according to a boring process.

With the optical modulator according to the seventh embodiment, the monitor light propagated through output optical waveguide 12d travels into two-dimensional optical waveguide 5, is reflected by reflecting mirror 4 to travel through two-dimensional optical waveguide 5 toward photodetector 10, output from an end face of two-dimensional optical waveguide 5, and detected by photodetector 10. Since the monitor light propagated through output optical waveguide 12d can be oriented in a desired direction and extracted by reflecting mirror 4 and two-dimensional optical waveguide 5, photodetector 10 can be placed in a desired position on a side of optical substrate 11 as in the sixth embodiment. Therefore, photodetector 10 may be disposed in a position out of interference with electric connectors and an optical fiber for transmitting the modulated light. Because the optical path conversion carried out by reflecting mirror 4 generally has small wavelength dependency, the optical modulator can be designed with greater freedom.

Inasmuch as the monitor light is extracted from the side of optical substrate 11, it is preferable according to the seventh embodiment from a layout viewpoint to mount photodetector 10 on the package which houses the optical modulator.

8th Embodiment

Figure 16:
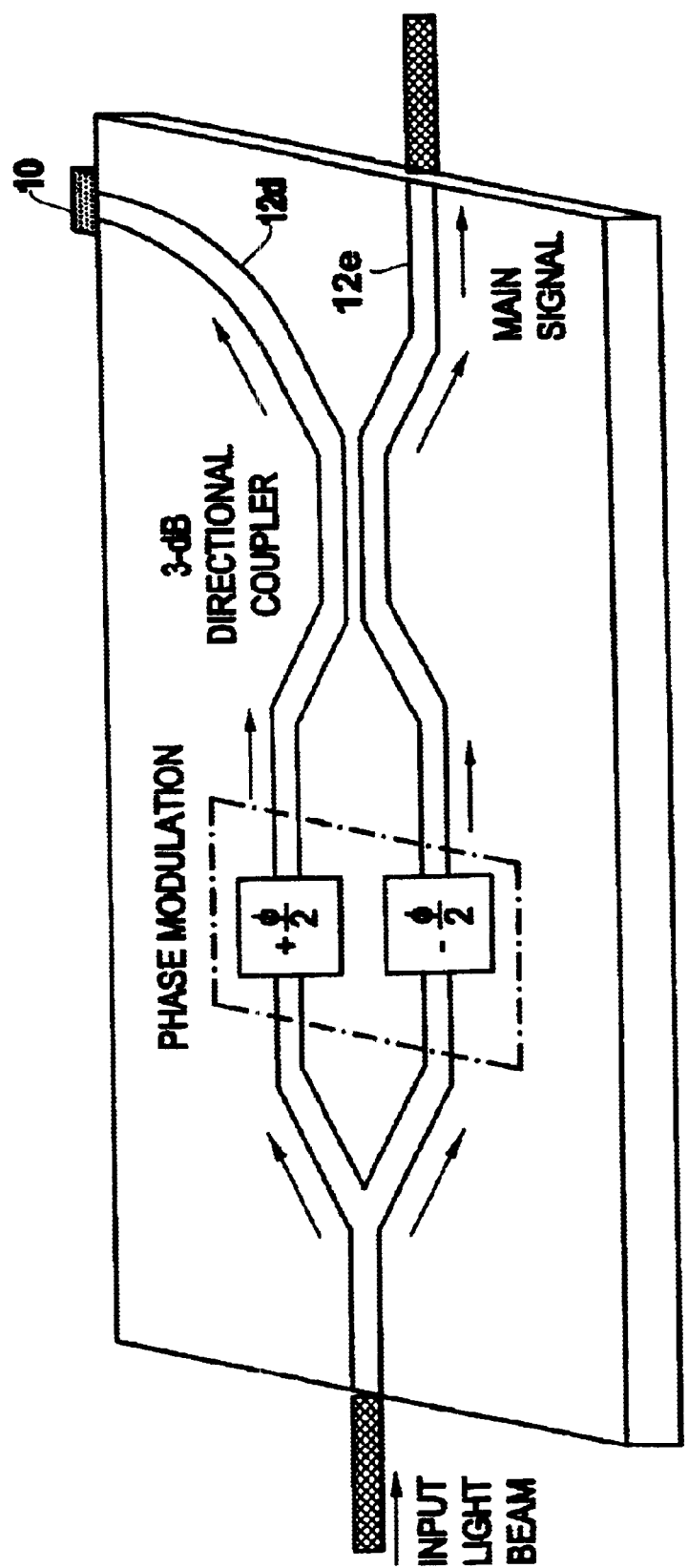
FIG. 16 is a schematic plan view of an optical modulator with a monitor according to an eighth embodiment of the present invention.

FIG. 16 shows an optical modulator with a monitor according to an eighth embodiment of the present invention. The optical modulator according to the eighth embodiment is similar to the optical modulator shown in FIG. 6 except that output optical waveguide 12d comprises a bent optical waveguide.

Output optical waveguide 12d comprises an optical waveguide bent stepwise at certain angles, and has an output end face on a side of optical substrate 11 which is different from the end face of optical substrate 11 where the end face of output optical waveguide 12e is positioned. Photodetector 10 is fixed in a given position on the side of optical substrate 11 for detecting light output from the end face of output optical waveguide 12d.

The bent optical waveguide can be made according to an ordinary optical waveguide fabrication process. Since a smaller optical path converter is desirable in view of reduced sizes of optical modulator devices, the bent optical waveguide should preferably be of a reduced size having a reduced radius of curvature. To reduce the radius of curvature of the bent optical waveguide, the bent portion of the optical waveguide is fabricated to provide a high refractive index.

With the, optical modulator according to the eighth embodiment, the monitor light can be guided in a desired direction by the bent optical waveguide for being extracted from the optical modulator, and photodetector 10 can be placed in a desired position on a side of optical substrate 11. Therefore, photodetector 10 may be disposed in a position out of interference with electric connectors and an optical fiber for transmitting the modulated light.

As with the seventh embodiment, inasmuch as the monitor light is extracted from the side of optical substrate 11, it is preferable according to the eighth embodiment from a layout viewpoint to mount photodetector 10 on the package which houses the optical modulator.

9th Embodiment

Figure 17:
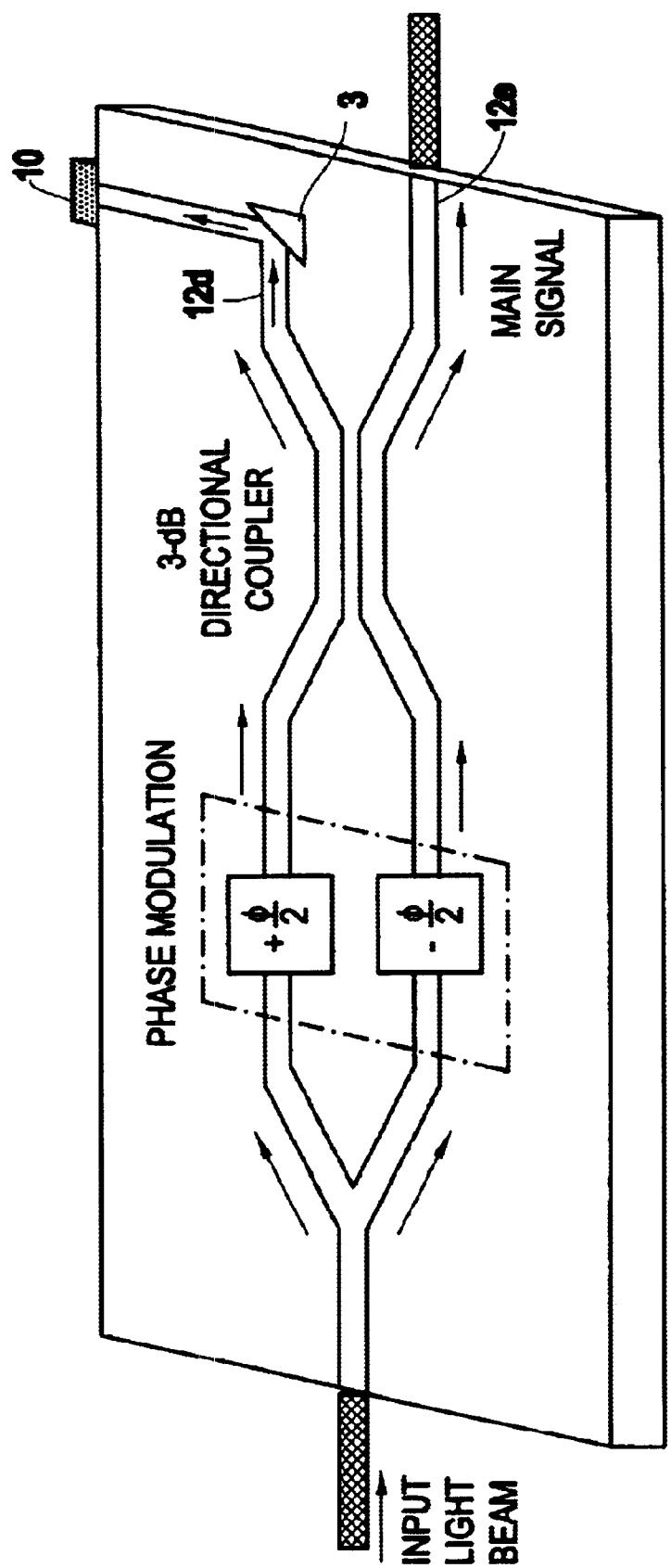
FIG. 17 is a schematic plan view of an optical modulator with a monitor according to a ninth embodiment of the present invention.

FIG. 17 shows an optical modulator with a monitor according to a ninth embodiment of the present invention. The optical modulator according to the ninth embodiment is similar to the optical modulator shown in FIG. 6 except for a structure for guiding monitor light to photodetector 10.

The optical modulator according to the ninth embodiment has output optical waveguide 12d bent in an angular pattern with reflecting mirror 3 disposed in the bent portion thereof. Reflecting mirror serves to reflect the monitor light propagated through output optical waveguide 12d through an angle of 90° toward photodetector 10. Reflecting mirror 4 is made of a material whose refractive index is different from the refractive index of output optical waveguide 12d. For example, reflecting mirror 3 may be produced by forming a region of lower refractive index by not diffusing titanium, for example. Alternatively, reflecting mirror 3 may be produced by forming a hole according to a boring process.

With the optical modulator according to the ninth embodiment, the monitor light propagated through output optical waveguide 12d is reflected by reflecting mirror 3 to travel toward photodetector 10, output from an end face of output optical waveguide 12d, and detected by photodetector 10. Therefore, photodetector 10 can be placed in a desired position on a side of optical substrate 11. Therefore, photodetector 10 may be disposed in a position out of interference with electrical connectors and an optical fiber for transmitting the modulated light. Because the optical path conversion carried out by reflecting mirror 3 generally has small wavelength dependency, the optical modulator can be designed with greater freedom.

As with the seventh embodiment, inasmuch as the monitor light is extracted from the side of optical substrate 11, it is preferable according to the eighth embodiment from a layout viewpoint to mount photodetector 10 on the package which houses the optical modulator.

10th Embodiment

Figure 18:
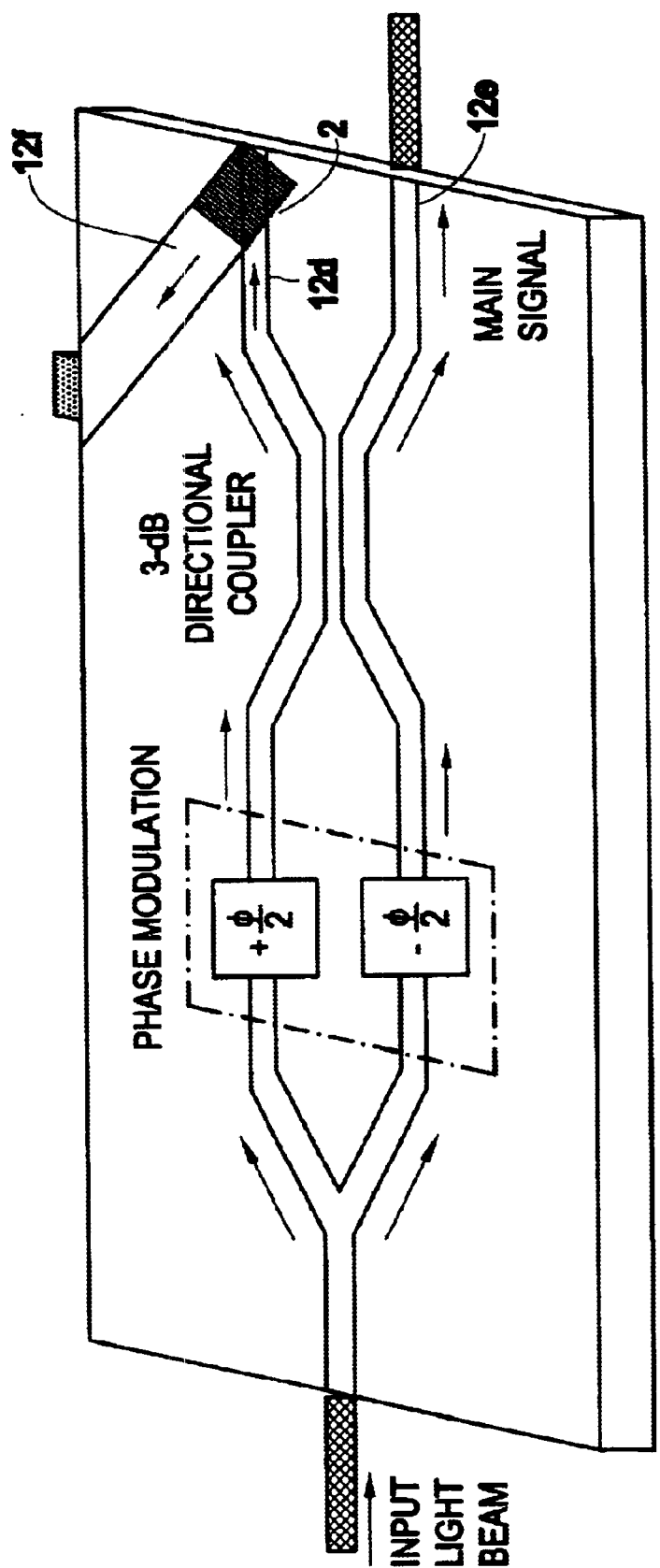
FIG. 18 is a schematic plan view of an optical modulator with a monitor according to a tenth embodiment of the present invention.

FIG. 18 shows an optical modulator with a monitor according to a tenth embodiment of the present invention. The optical modulator according to the tenth embodiment is similar to the optical modulator shown in FIG. 6 except for a structure for guiding monitor light to photodetector 10.

The optical modulator according to the tenth embodiment has grating 2 formed as the optical path converter in output optical waveguide 12d, and output optical waveguide 12f for propagating guided light whose optical path has been converted by grating 2. Output optical waveguide 12f has its output end face on a side of optical substrate 11 which is different from the end face of optical substrate 11 where the end face of output optical waveguide 12e is positioned. Photodetector 10 is fixed in a given position on the side of optical substrate 11 for detecting light output from the end face of output optical waveguide 12f.

As with the fourth embodiment, grating 2 may be of an index-modulated or relief-shaped grating structure, and may be patterned according to a known photolithographic process using a resist mast, a two-beam interference process, or an electron beam lithography process. Alternatively, a periodic refractive index distribution may be formed by depositing a thin dielectric film on the optical waveguide or doping the optical waveguide with a dielectric material.

With the optical modulator according to the tenth embodiment, the monitor light propagated through output optical waveguide 12d is converted in optical path by grating 2, travels through output optical waveguide 12f, and is detected by photodetector 10. Since photodetector 10 can be placed in a desired position on a side of optical substrate 11, photodetector 10 may be disposed in a position out of interference with electric connectors and an optical fiber for transmitting the modulated light.

As with the seventh embodiment, inasmuch as the monitor light is extracted from the side of optical substrate 11, it is preferable according to the tenth embodiment from a layout viewpoint to mount photodetector 10 on the package which houses the optical modulator.

While preferred embodiments of the present invention have been described using specific terms, such description is for illustrative purposes only, and it is to be understood that changes and variations may be made without departing from the spirit or scope of the following claims.

What is claimed is:

1. An optical modulator with a monitor, comprising:
   an input optical waveguide;
   two branched optical waveguides for causing light waves propagated therethrough to interfere with each other for a modulation process;

a branching waveguide interconnecting said input optical waveguide and said two branched optical waveguides to each other;

two output optical waveguides;

a 3-dB directional coupler interconnecting said branched optical waveguides with said output optical waveguides to each other; and photodetector means for detecting light output from one of said output optical waveguides as monitor light.

2. An optical modulator according to claim 1, further comprising:

an additional fiber coupled to an output end face of said one of the output optical waveguides from which at least the light output is detected as the monitor light.

3. An optical modulator according to claim 1, further comprising:

a grating coupler forming in said one of the output optical waveguides, for converging guided light to an external point for being extracted.

4. An optical modulator according to claim 1, further comprising:

a groove formed in said one of output optical waveguides, for extracting guided light therefrom, said groove comprising one of:
a "V" groove; and
a "^" groove.

5. An optical modulator according to claim 1, further comprising:

a two-dimensional optical waveguide having an end face coupled to an output end face of said one of the output optical waveguides; and a curved waveguide formed as part of said two-dimensional optical waveguide, for converting an optical path of guided light.

6. An optical modulator according to claim 1, further comprising:

a two-dimensional optical waveguide having an end face coupled to an output end face of said one of the output optical waveguides; and a reflecting mirror formed in said two-dimensional optical waveguide, for converting an optical path of guided light.

7. An optical modulator according to claim 1, further comprising:

a bent optical waveguide having a predetermined radius of curvature for receiving and propagating the light output as the monitor light.

8. An optical modulator according to claim 1, further comprising:

an angular output optical waveguide for receiving and propagating the light output as the monitor light; and a reflecting mirror disposed in a bent portion of said angular output optical waveguide, for reflecting guided light.

9. An optical modulator according to claim 1, further comprising:

a grating formed in said one of the output optical waveguides, for converting an optical path of guided light; and an additional output optical waveguide for propagating the guided light whose optical path has been converted by said grating.

10. An optical modulator with a monitor, comprising:

an input optical waveguide;

two branched optical waveguides for causing light waves propagated therethrough to interfere with each other for a modulation process;

a branching waveguide interconnecting said input optical waveguide and said two branched optical waveguides to each other;

two output optical waveguides;

a 2-input, 2-output multimode interferometric optical waveguide interconnecting said branched optical waveguides and said output optical waveguides to each other; and photodetector means for detecting light output from one of said output optical waveguides as monitor light.

11. An optical modulator according to claim 10, further comprising:

an optical fiber coupled to an output end face of said one of the output optical waveguides from which at least the light output is detected as the monitor light.

12. An optical modulator according to claim 10, further comprising:

a grating coupler forming in said one of the output optical waveguides, for converging guided light to an external point for being extracted.

13. An optical modulator according to claim 10, further comprising:

a groove formed in said one of output optical waveguides, for extracting guided light therefrom, said groove comprising one of:
a "V" groove; and
a "^" groove.

14. An optical modulator according to claim 10, further comprising:

a two-dimensional optical waveguide having an end face coupled to an output end face of said one of the output optical waveguides; and a curved waveguide formed as part of said two-dimensional optical waveguide, for converting an optical path of guided light.

15. An optical modulator according to claim 10, further comprising:

a two-dimensional optical waveguide having an end face coupled to an output end face of said one of the output optical waveguides; and a reflecting mirror formed in said two-dimensional optical waveguide, for converting an optical path of guided light.

16. An optical modulator according to claim 10, further comprising:

a bent optical waveguide having a predetermined radius of curvature for receiving and propagating the light output as the monitor light.

17. An optical modulator according to claim 10, further comprising:

an angular output optical waveguide for receiving and propagating the light output as the monitor light; and a reflecting mirror disposed in a bent portion of said angular output optical waveguide, for reflecting guided light.

18. An optical modulator according to claim 10, further comprising:

a grating formed in said one of the output optical waveguides, for converting an optical path of guided light; and an additional output optical waveguide for propagating the guided light whose optical path has been converted by said grating.

19. An optical modulator, comprising:

a substrate;

an input optical waveguide section formed on said substrate;

a branching waveguide section by which said input optical waveguide section is branched into two paths;

a first branched optical waveguide extending from a first of said branching waveguide sections;

a second branched optical waveguide extending from a second of said branching waveguide sections;

a modulation signal electrode formed in a first region of said first branched optical waveguide; and a ground electrode formed in a first region of said second branched optical waveguide, wherein said first branched optical waveguide and said second branched optical waveguide are shaped to form, in a second region, a 3-dB directional coupler.

20. The optical modulator of claim 19, further comprising:

an interface for transmitting light output from said first branched optical waveguide as a monitor light.

21. The optical modulator of claim 20, further comprising:

a photodiode for receiving said light transmitted from said interface.

* * * * *